Figure 1:
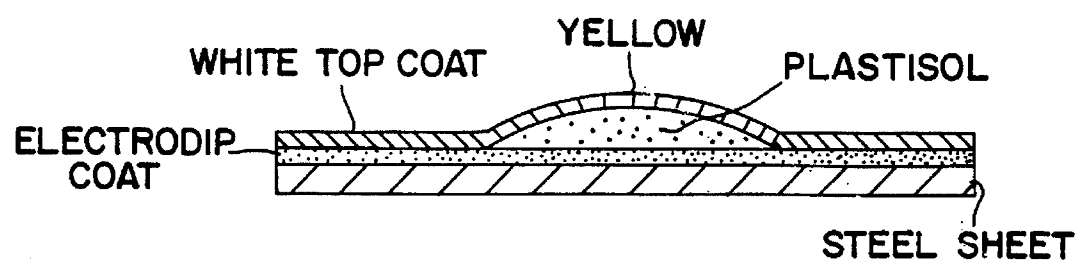

US005475056A

United States Patent [19]

Koesters et al.

[11] Patent Number: 5,475,056

[45] Date of Patent: Dec. 12, 1995

[54] PLASTISOLS WHICH PREVENT THE YELLOWING OF TOP COATS, PROCESS FOR THEIR PREPARATION AND USE

[75] Inventors: Bernhard Koesters, Eppelheim; Xaver Muenz, Hirschberg; Manfred Asang, Schwetzingen, all of Germany

[73] Assignee: Teroson GmbH, Heidelburg, Germany

[21] Appl. No.: 421,145

[22] Filed: Apr. 13, 1995

Related U.S. Application Data

[63] Continuation of Ser. No. 133,188, filed as a PCT/EP92/00859, Apr. 17, 1992, abandoned.

[30] Foreign Application Priority Data

Apr. 19, 1991 [DE] Germany .......................... 41 12 823.0

[51] Int. Cl.[6] .......................... C08K 5/3477; C08K 5/12; C08K 5/07; B05D 7/16

[52] U.S. Cl. ............................ 524/89; 524/292; 524/296; 524/297; 524/306; 524/354; 524/355; 524/356; 524/357; 524/358; 524/359; 524/569; 524/143; 524/141; 427/429

[58] Field of Search ............................. 524/89, 292, 296, 524/297, 354, 355, 356, 357, 358, 359, 569, 306, 143, 141; 427/409

[56] References Cited

U.S. PATENT DOCUMENTS

| | | | |
|---|---|---|---|
| 3,383,337 | 5/1968 | Garling et al. | 524/297 |
| 4,048,362 | 9/1977 | Moring et al. | 428/36.7 |
| 4,195,140 | 3/1980 | Sexsmith et al. | 525/523 |
| 4,210,567 | 7/1980 | Kösters | 524/297 |
| 4,254,006 | 3/1981 | Robertson | 524/509 |
| 4,558,084 | 12/1985 | Quis et al. | 524/294 |
| 4,673,710 | 6/1987 | Burba et al. | 523/455 |
| 4,900,771 | 2/1990 | Gerace et al. | 524/296 |
| 4,940,748 | 7/1990 | Abend et al. | 524/521 |
| 5,021,482 | 6/1991 | Wozniak | 524/100 |

FOREIGN PATENT DOCUMENTS

| | | |
|---|---|---|
| 0150803 | 8/1985 | European Pat. Off. . |
| 2654871 | 6/1978 | Germany . |
| 2840996 | 3/1979 | Germany . |
| 3821926 | 2/1990 | Germany . |

*Primary Examiner*—Peter A. Szekely

*Attorney, Agent, or Firm*—Ernest G. Szoke; Wayne C. Jaeschke; Real J. Grandmaison

[57] ABSTRACT

The invention relates to plastisols which prevent a yellowing of top coats applied thereon, to a process for their preparation and to their use. The plastisols based on PVC or methacryl contain, in addition to basic adhesion promoters, aldehydes, ketones, their derivatives, oligomers or mixtures of same.

8 Claims, 1 Drawing Sheet

PLASTISOLS WHICH PREVENT THE YELLOWING OF TOP COATS, PROCESS FOR THEIR PREPARATION AND USE

This application is a continuation of application Ser. No. 08/133,188 filed on filed as a PCT/EP92/00859, Apr. 17, 1992, now abandoned.

FIELD OF THE INVENTION

The invention relates to plastisols which prevent yellowing of top coats applied thereon, to a process for their preparation and their use.

BACKGROUND OF THE INVENTION

Plastisols are used in the car industry for undersealing and for seam-closing and sealing. Depending on the application aim, further aggregates are added to the plastisols, which are dispersions of fine polymer particles in liquid plasticizers. Such aggregates are flow-improvers, stabilizers, adhesion promoters, fillers and water-absorbing substances. Adhesion promoters are added to the plastisols to produce long-life adhesion of the plastisols to steel or galvanized, tin-plated or electro-dip coated steel sheets. As adhesion promoters for PVC plastisols, basic compounds such as polyaminoamides (PAA) are used, for example. In contrast, as adhesion promoters for polymethacrylic plastisols, usually basic vinyl imidazoles are used, to which polyaminoamides are optionally added as additional adhesion promoter component. The other aggregates are likewise often basic compounds, e.g. calcium oxide, barium oxide and calcium carbonate. With the final coating, the plastisols are coated over at the same time.

Since electro-dip coats, particularly cathodic electro-dip coats are used for priming steel parts and sheets, it is observed that the coats applied to the plastisols yellow with time. This problem particularly affects light, pastel-coloured and white coats, because with these the discoloration is more easily noticed, particularly if they are applied without an intermediate coat (filler). Yellowing is especially serious with white coats. Yellowing does not in most cases appear immediately after stoving of the top coating, but only after some time. This is not a question of a yellowing of the plastisol itself, which could possibly appear through the top-coat layer, but of a gradual discoloration of the top coat itself.

To solve this problem, it was proposed in DE-A-38 21 926 to add as additives to the plastisols acid cation exchangers, whose effect is seen in that upon stoving they bind liberated amines. The addition of acid substances however has the disadvantage that they reduce or even inhibit the effect of basic adhesion promoters. Further, acid components react with other basic substances optionally present in the plastisol such as calcium oxide and chalk, so that carbon dioxide and water form and the plastigels formed from the plastisols become porous.

DESCRIPTION OF THE INVENTION

The aim of the invention is to prevent the yellowing of a top coat which is applied to steel parts or metal sheets which have been primed with an electro-dip coat and treated with plastisols, either with or without an intermediate coat, without having to use acid plastisol aggregates.

This aim is achieved with plastisols which, in addition to basic adhesion promoters, and as further additive contain simple aldehydes, ketones, their derivatives, oligomers or mixtures of same.

FIG. 1 illustrates a top coat over an electrodip coat applied to a steel sheet to which has been applied a plastisol and which top coat develops yellowing over time.

Preferred embodiments of the invention are the subject of the subsidiary claims.

Particularly suitable as yellowing-inhibiting additive are aliphatic monoaldehydes such as formaldehyde, acetaldehyde and propionaldehyde or simple aromatic aldehydes and ketones such as benzaldehyde, benzophenone or benzoquinone as well as their derivatives. Hexamethylenetetramine (urotropin or 1,3,5,7-tetra-azaadamantane), which splits off formaldehyde under the said conditions, has proved especially effective. However, also suitable are for example di-, tri- or tetramers (oligomers) of the aldehydes such as trioxymethylene (1,3,5-trioxane), paraldehyde (2,4,6-trimethyl-1,3,5-trioxane) or metaldehyde (a tetramer of acetalaldehyde $(C_2H_4O)_4$).

The plastisols according to the invention already have a yellowing-inhibiting effect from a content of approximately 0.001% of "anti-yellowing additive". Preferably, the content of this additive is 0.05 to 5%, a content of 0.1 to 3% being especially preferred.

The yellowing-inhibiting effect becomes especially clear if, in addition to the basic polyaminoamides usable for example as adhesion promoter, several of the other basic aggregates are present in the plastisol in relatively large amounts. Advantageously the plastisols also contain only basic adhesion promoter components. But even if these basic components are reduced to the extent that is still just necessary, no discoloration takes place under very unfavourable circumstances (thick-layer electro-dip coating, warm, very humid atmosphere etc.) in the presence of the yellowing-inhibiting additive.

It is assumed that the yellowing substance is a basic compound which could be captured with acid compounds. However, the use of acid additives is to be avoided. Through the aldehyde or ketone, which optionally must first be released from a derivative, the concentration of the yellowing basic substance is presumably lowered at least until yellowing is no longer observable.

Of course, the plastisol can also contain other additives whose effects are not impaired by the anti-yellowing additive.

During preparation of the plastisol the yellowing-inhibiting additive is mixed in together with the other additives to be incorporated. The individual additives, however, can also be individually made into a paste for example with the liquid plasticizer prior to mixing to form the plastisol compound and added to the plastisol in this form.

Embodiments: plastisols

| | PVC Plastisols | | | |
|---|---|---|---|---|
| | $A_a$ | $A_b$ | $B_a$ | $B_b$ |
| PVC homopolymer (K value 70) | 20 | 20 | 30 | 30 |
| Plasticizer (DINP) | 30 | 30 | 35 | 35 |
| Thinner (white spirit 180/210) | 5 | 5 | — | — |
| Filler (chalk) | 43 | 44 | 29 | 30 |
| CaO | — | — | 1 | 1 |
| $TiO_2$ | — | — | 2 | 2 |
| $SiO_2$ | — | — | 0.5 | 0.5 |

-continued

| PVC Plastisols | $A_a$ | $A_b$ | $B_a$ | $B_b$ |
|---|---|---|---|---|
| Basic lead sulphate | — | — | 0.5 | 0.5 |
| Adhesion promoter (PAA) | 1 | 1 | 1 | 1 |
| Urotropin | 1 | — | 1 | — |
| | 100 | 100 | 100 | 100 |

| Acrylate plastisols: | $C_a$ | $C_b$ |
|---|---|---|
| Poly-MMA/BMA with 2% vinyl imidazole | 30 | 30 |
| DINP | 40 | 40 |
| Chalk | 29.2 | 28.9 |
| CaO | 0.5 | 0.5 |
| Urotropin | 0.3 | — |
| | 100 | 100 |

MMA = methyl methacrylate;
BMA = butyl methacrylate

Preparation methods:

1. PVC plastisol $A_a$ with all components directly mixed as one-pot process. PVC plastisol $A_b$ without urotropin likewise.
2. PVC plastisol $A_a$: urotropin is dispersed in plasticizer, finely abraded on a roll and then added to the plastisol.
3. PVC plastisol $B_a$ (in the case of $B_b$ without urotropin): mix all solid additives ($CaCO_3$, CaO, $TiO_2$ etc+urotropin) with a little plasticizer, abrade and finally add the rest, i.e. PAA and polymers.
4. Acrylic plastisols ($C_a$ and $C_b$) as 1.

During vehicle construction, after the sheets have been coated with an electro-dip coat and treated with plastisol, say at occurring weld seams, they are provided with a top coat. This coat is subsequently stored.

For example, plastisol is applied to the sheets coated with electro-dip coat to achieve the effect according to the invention and made to gel at 140° C. for 30 minutes. Then, optionally, filler coats are sprayed onto the sheet and onto the plastisol, ventilated for 10 minutes and stoved at 130° C. Subsequently the top coat is sprayed on, dried for 10 minutes and stored for 20 minutes at 130° C.

To speed up determination of the degree of yellowing occurring with sheets thus treated, test sheets were manufactured.

1. Pretreatment of the test sheets
2. Electro-dip coat coated sheets are laid on top of each other, a distance of 1 mm between them being maintained with the aid of interspersed spheres. The sheets are securely wrapped in aluminium foil to maintain high condensate concentrations on the inner surfaces of both sheets during the following 30 minute heat treatment at 180° C. After cooling down, the aluminium foil is removed and to better determine the effect of the electro-dip coat a strip of 10 to 20 mm of the electro-dip coat is removed from the centre of the sheet.
3. Manufacture of the test sheets The plastisol is applied as a bead, 0 to 4 mm high and 50 mm long, to the inner side of the test sheet. Afterwards, the plastisol is crosslinked at the necessary temperature. The white top coat is sprayed in a thickness of 30 to 40 μm onto the cooled sheet and cured under the necessary storing conditions (see FIG. 1.).

4. Storage conditions

The test sheets are suspended in a securely closed box, whose base is covered with water (water depth 10 to 20 mm). The box is stored at 60° C.

5. Evaluation

According to quality, the first results can be obtained after several hours, days or a few weeks.

The yellowing of the sheets is rated in each case with values of 0 to 10, 0 signifying a complete yellowing and 10 virtually no yellowing.

Test results:

| Plastisol No. | Prepared as per | Tested as per quick method | leaving at room temp. | Rating after x days | Appraisal |
|---|---|---|---|---|---|
| 1) $A_a$ | 1 | x | | 2 | 10 |
| 2) $A_b$ | 1 | x | | 2 | 4 |
| 3) $A_a$ | 1 | x | | 6 | 10 |
| 4) $A_b$ | 1 | x | | 6 | 2 |
| 5) $A_a$ | 2 | x | | 2 | 10 |
| 6) $A_a$ | 2 | x | | 6 | 10 |
| 7) $A_a$ | 3 | | x | 8 | 10 |
| 8) $A_b$ | 3 | | x | 8 | 7 |
| 9) $A_a$ | 3 | | x | 40 | 10 |
| 10) $A_b$ | 3 | | x | 40 | 2 |
| 11) $B_a$ | 1 | x | | 6 | 10 |
| 12) $B_b$ | 1 | x | | 6 | 3 |
| 13) $C_a$ | 4 | x | | 6 | 10 |
| 14) $C_b$ | 4 | x | | 6 | 2 |

The results that can be seen from the Table clearly show that the plastisols to which an anti-yellowing additive was added are superior to the conventional plastisols in terms of the yellowing phenomenon. Even after relatively long weathering, no discoloration is discernible.

The invention further comprises a process for preparing the plastisols according to the invention and their use on steel parts and sheets primed with electro-dip coat.

We claim:

1. The method of inhibiting yellow-discoloration of a top coat applied to steel or steel parts primed with an electro-dip coat, comprising applying to said primed steel or steel parts a plastisol component selected from the group consisting of polyvinylchloride, polymethacrylate, and copolymers thereof, a plasticizer, at least one basic adhesion promoter, and at least one non-yellowing additive selected from the group consisting of:

(a) aldehydes, (b) ketones, (c) hexamethylenetetramine, and (d) mixtures of (a) and (b) or (a) and (c) or (b) and (c) or (a) and (b) and (c).

2. A method as in claim 1 wherein said non-yellowing additive is selected from the group consisting of formaldehyde, acetaldehyde, propionaldehyde, benzaldehyde, benzophenone, benzoquinone, hexamethylenetetramine, trioxymethylene, paraldehyde and metaldehyde.

3. A method as in claim 1 wherein said non-yellowing additive comprises hexamethylenetetramine.

4. A method as in claim 1 wherein said plastisol contains at least 0.001% by weight of said non-yellowing additive, based on the weight of said plastisol.

5. A method as in claim 1 wherein said plastisol contains from 0.05 to 3% by weight of non-yellowing additive, based on the weight of said plastisol.

6. A method is in claim 1 wherein said adhesion promoter is selected from the group consisting of polyaminoamides, vinyl imidazoles, and mixtures thereof.

7. A method as in claim 1 wherein additional dimers, trimers and tetramers are present in said plastisol.

8. The method of inhibiting yellow-discoloration of a top coat applied to steel or steel parts primed with an electro-dip coat, comprising adding to a polyvinylchloride or polymethacrylate plastisol composition a non-yellowing additive selected from the group consisting of a) aldehydes, b) ketones, c) hexamethylenetetramine, and (d) mixtures of (a) and (b) or (a) and (c) or (b) and (c) or (a) and (b) and (c), and applying the plastisol composition containing said additive onto said primed steel or steel parts prior to applying said top coat.

* * * * *